United States Patent
Joseph

[19]

[11] Patent Number: 5,878,401
[45] Date of Patent: Mar. 2, 1999

[54] SALES AND INVENTORY METHOD AND APPARATUS

[76] Inventor: Joseph Joseph, 470 Kent Ave., Brooklyn, N.Y. 11211

[21] Appl. No.: 599,184

[22] Filed: Feb. 9, 1996

[51] Int. Cl.$^6$ .............................. G06F 17/60; G07G 1/14
[52] U.S. Cl. ................................................ 705/22; 705/27
[58] Field of Search .................................. 705/22, 21, 16, 705/26, 27

[56] References Cited

U.S. PATENT DOCUMENTS

| | | |
|---|---|---|
| 3,757,037 | 9/1973 | Bialek . |
| 4,737,910 | 4/1988 | Kimbrow . |
| 4,814,592 | 3/1989 | Bradt et al. . |
| 4,974,196 | 11/1990 | Iwami et al. . |
| 4,982,346 | 1/1991 | Girouard et al. . |
| 4,984,155 | 1/1991 | Geier et al. . |
| 4,992,940 | 2/1991 | Dworkin . |
| 5,032,989 | 7/1991 | Tornetta . |
| 5,206,804 | 4/1993 | Thies et al. . |
| 5,231,566 | 7/1993 | Blutinger et al. . |
| 5,291,395 | 3/1994 | Abecassis . |
| 5,319,542 | 6/1994 | King, Jr. et al. . |
| 5,367,627 | 11/1994 | Johnson . |
| 5,383,111 | 1/1995 | Homma et al. ............................ 705/27 |

OTHER PUBLICATIONS

Krakowka, Lisa, "Clothes Call," American Demographics, pp. 40–42, Nov/Dec 1995. Nov. 1995.
"Retailing 2000," Chain Store Age Executive Edition, p. 58. Apr. 1994.
Stevens, Larry, "Point–of–Sale Inventory Systems: Now Ready for Small Businesses," Nation's Business, V.79, N.12, p. 41. Dec. 1991.
"Techno–Shop," Home Fashions Magazine, p. 18. Apr. 1993.

*Primary Examiner*—Emanuel Todd Voeltz
*Assistant Examiner*—Alexander Kalinowski
*Attorney, Agent, or Firm*—David M. Klein; Shearman & Sterling

[57] ABSTRACT

An apparatus that displays alternative items for items that are out of stock in a store or the like. A request for an item is entered into a sales computer. The computer determines from a database whether the requested item is available. If the item is unavailable, the computer determines alternative items that are available for sale. These available alternative items are interactively displayed for the customer. The alternative items are determined from an alternative item database wherein each item is categorized with alternative items. A mass data storage device stores an image of each alternative item. A method of determining and displaying alternative items includes the steps of: inputting a request for an item; determining the availability of the requested item and alternative items for the requested item if it is unavailable; and interactively displaying the alternative items. An electronic monitoring apparatus for a store includes: a sales computer for entering sales requests; a database for storing the request and associated information on each item ordered; a stock area computer, wherein the request is transmitted from the sales computer to the stock area computer; and a report generation system capable of generating a report selected from the group consisting of Items Requested, Items Delivered, Items Returned, Items Sold, Requests by SKU, Sales Person Report, Sales Person Summary Report, Time of Requests Analysis, and Time of Sales Analysis.

6 Claims, 9 Drawing Sheets

FIG. 1

| SKU | RECEIVE00 | ••• | RECEIVE14 | SOLD00 | ••• | SOLD14 |
|---|---|---|---|---|---|---|
| 3242861 | 16 | | 12 | 4 | | 1 |
| 8132954 | 8 | | 2 | 9 | | 2 |

FIG. 2

| SIZE CONVERSION DATABASE | | | | | |
|---|---|---|---|---|---|
| SIZE RANGE | SIZE BRACKET OO | SIZE BRACKET 01 | SIZE BRACKET 02 | ••• | SIZE BRACKET 14 |
| 01 | 1 | 1 ½ | 2 | ••• | 8 |
| 02 | 6 | 6 ½ | 7 | ••• | 13 |
| 03 | 40 | 41 | 42 | ••• | 54 |

| DATE | STAT | REQ NUM | SKU | SIZE | BIN LOCATION | REQ BY | TIME REQ |
|---|---|---|---|---|---|---|---|
| 12/08/95 | 01 | 698117 | 646-0020- | 3 | F-36 | 12RZ | 09:31:34 |
| 12/08/95 | 01 | 698119 | 835-0113- | 4 | D-25 | 12J3 | 09:39:33 |
| 12/08/95 | 01 | 698120 | 835-0103- | 7 | C-14 | 12J3 | 09:40:49 |
| 12/08/95 | 01 | 698122 | 646-0058- | 0 | G-16 | 12J3 | 09:42:54 |
| 12/08/95 | 01 | 698128 | 646-0068- | 8 | J-43 | 12J3 | 09:57:28 |

FIG. 7

1 - REQUEST
2 - PICK TICKET
3 - DELIVER
4 - RETURN
5 - NO STOCK
6 - SOLD
7 - ALL
8 - SUMMARY
9 - BY SKU

ESC - EXIT

FIG. 6

| DATE | STAT | REQ # | SKU | SIZE | BIN LOCATION | REQ BY | TIME REQ | DEL. LAPS | DEL. AGE |
|---|---|---|---|---|---|---|---|---|---|
| 12/08/95 | 03 | 698163 | 863-0038-9004-5 | 3 | KK-32 | 12BE | 11:10:00 | :07 | :49:14 |
| 12/08/95 | 03 | 698192 | 836-0158-9006-9 | 5+ | C-25 | 12SU | 11:43:00 | :26 | :16:42 |
| 12/08/95 | 03 | 698207 | 836-0229-0106-1 | 10+ | D-47 | 12F3 | 11:55:00 | :29 | :04:37 |

FIG. 8

| DATE | STAT | REQ # | SKU | SIZE | BIN LOCATION | REQ BY | TIME REQ | DEL. LAPS | RET. LAPS |
|---|---|---|---|---|---|---|---|---|---|
| 12/08/95 | 04 | 698116 | 834-0264-9006-0 | 5+ | D-48 | 12J3 | 09:27 | :29 | :12:43 |
| 12/08/95 | 04 | 698114 | 312-9956-9004-3 | 7+ | I-42-43 | 12J3 | 09:17 | :01:10 | :22:11 |
| 12/08/95 | 04 | 698118 | 863-0018-9004-0 | 2+ | C-35 | 12J3 | 09:36 | :52 | :05:18 |
| 12/08/95 | 04 | 698124 | 755-0101-9009-5 | 9 | AA-51 | 12J3 | 09:44 | :31 | :03:51 |
| 12/08/95 | 04 | 698125 | 643-0147-1013-8 | 12 | B-31 | 12J3 | 09:47 | :49 | :02:23 |

FIG. 9

| DATE | STAT | REQ NUM | SKU | SIZE | BIN LOCATION | REQ BY | TIME REQ | TIME SOLD |
|---|---|---|---|---|---|---|---|---|
| 12/08/95 | 06 | 698115 | 312-9956-9005-3 | 8 | I-42-43 | 12J3 | 09:20:12 | 09:24 |
| 12/08/95 | 06 | 698126 | 643-0147-1011-8 | 11 | 8-31 | 12J3 | 09:50:29 | 09:25 |
| 12/08/95 | 06 | 698129 | 646-0057-9013-2 | 12 | F-11 | 12J3 | 09:58:15 | 10:07 |
| 12/08/95 | 06 | 698127 | 754-1200-0109-4 | 9 | DD-51-53 | 12J3 | 09:55:56 | 10:08 |
| 12/08/95 | 06 | 698121 | 863-0018-9005-0 | 3 | C-35 | 12J3 | 09:42:31 | 10:08 |

FIG. 10

FOR: 12J3 KIMBERLY SMITH

| DATE | REQ NUM | SKU | VENDOR STYLE | TIME REQ | PRICE $ |
|---|---|---|---|---|---|
| 12/08/95 | 698115 | 312-9956-9005-3 | 10066 | 9:20:12 | 79.99 |
| 12/08/95 | 698121 | 863-0018-9005-0 | 1511151/91 | 9:42:31 | 39.99 |
| 12/08/95 | 698126 | 643-0147-1011-8 | 19165 | 9:50:29 | 24.99 |
| 12/08/95 | 698127 | 754-1200-0109-4 | 2-71 | 9:55:56 | 49.99 |

TOTAL AMOUNT: $194.96

SKU: 863-0018  DESC.: KID TRAINER MARAUDER WHT/SPRUC  LOCATION: C-35

VENDOR: 0492  NIKE INC.  VENDOR STYLE: 1511151/91

| DATE | TIME | REQ. # | SALESPERSON | SIZE | STATUS | DATE | TIME |
|---|---|---|---|---|---|---|---|
| 12/08/95 | 09:42:31 | 698121 | 12J3 KIMBERLY SMITH | 3 06 | SOLD | 12/08/95 | 10:08 |
| 12/08/95 | 09:36:44 | 698118 | 12J3 KIMBERLY SMITH | 2+04 | RETURNED | 12/08/95 | 09:42:54 |
| 12/02/95 | 10:27:59 | 694149 | 12BE MARIA JAMES | 3 04 | RETURNED | 12/02/95 | 10:35:03 |
| 12/01/95 | 15:53:51 | 693800 | 12R6 DORIS G DOUGLAS | 1 06 | SOLD | 12/01/95 | 16:06 |

FIG. 13

| CODE | NAME | T1. REQ. | QTY. SOLD | AMOUNT $ | HOURS | RATIO | AVG. $ |
|---|---|---|---|---|---|---|---|
| 12BE | MARIA SMITH | 8 | 4 | 134.96 | | 2.00 | 33.74 |
| 12F3 | DAVID JONES | 3 | 1 | 24.99 | | 3.00 | 24.99 |
| 12H8 | IMARA PAUL | 9 | 4 | 162.96 | | 2.25 | 40.74 |
| 12J3 | KIMBERLY HALL | 46 | 10 | 454.90 | | 4.60 | 45.49 |
| 12R6 | DORIS G. FELICIANO | 8 | 1 | 14.99 | | 8.00 | 14.99 |
| | TOTAL: | 74.00 | 20.00 | 792.80 | | 19.85 | 159.95 |

| DAY | 8AM | 9AM | 10AM | 11AM | 12AM | 1PM | 2PM | 3PM | 4PM | 5PM | 6PM | 7PM | 8PM | 9PM | 10PM | 11PM | 12PM | TOTAL |
|---|---|---|---|---|---|---|---|---|---|---|---|---|---|---|---|---|---|---|
| FRIDAY | 19 | 34 | 18 | 48 | 96 | 68 | 47 | 56 | 66 | 58 | 33 | 10 | | | | | | 553 |
| SATURDAY | 10 | 21 | 32 | 54 | 50 | 79 | 59 | 102 | 51 | 58 | 24 | 21 | | | | | | 561 |
| SUNDAY | | 0 | 25 | 45 | 36 | 60 | 80 | 40 | 44 | 27 | 9 | | | | | | | 366 |
| MONDAY | 7 | 28 | 24 | 30 | 39 | 39 | 68 | 72 | 56 | 42 | 19 | 3 | | | | | | 427 |
| TUESDAY | 4 | 15 | 23 | 28 | 55 | 38 | 54 | 29 | 50 | 57 | 15 | | | | | | | 368 |
| WEDNESDAY | 17 | 32 | 48 | 58 | 43 | 54 | 31 | 68 | 45 | 37 | 24 | | | | | | | 457 |
| THURSDAY | 2 | 2026 | 34 | 42 | 53 | 35 | 56 | 55 | 59 | 49 | 4 | | | | | | | 435 |

FIG. 14

| DAY | 8AM | 9AM | 10AM | 11AM | 12AM | 1PM | 2PM | 3PM | 4PM | 5PM | 6PM | 7PM | 8PM | 9PM | 10PM | 11PM | 12PM | TOTAL |
|---|---|---|---|---|---|---|---|---|---|---|---|---|---|---|---|---|---|---|
| FRIDAY | 8 | 18 | 8 | 24 | 39 | 31 | 22 | 25 | 24 | 21 | 13 | 4 | | | | | | 553 |
| SATURDAY | 6 | 14 | 13 | 24 | 23 | 30 | 34 | 44 | 18 | 26 | 10 | 8 | | | | | | 561 |
| SUNDAY | | 0 | 14 | 21 | 17 | 24 | 34 | 16 | 19 | 8 | 2 | | | | | | | 366 |
| MONDAY | 4 | 15 | 12 | 16 | 14 | 17 | 35 | 34 | 21 | 23 | 9 | 2 | | | | | | 427 |
| TUESDAY | 1 | 7 | 11 | 19 | 31 | 18 | 20 | 12 | 20 | 25 | 9 | | | | | | | 368 |
| WEDNESDAY | 10 | 25 | 21 | 27 | 31 | 20 | 17 | 38 | 20 | 17 | 13 | 3 | | | | | | 457 |
| THURSDAY | 2 | 8 | 5 | 21 | 23 | 25 | 13 | 19 | 19 | 28 | 29 | 4 | | | | | | 435 |

FIG. 15

SALES AND INVENTORY METHOD AND APPARATUS

BACKGROUND OF THE INVENTION

1. Field of the Invention

The present invention relates generally to sales and inventory management systems, and more particularly to a sales system that enables customers to view alternative items in the event the customer orders an item that is out of stock, and to a sales and inventory system that enables tracking of requests for items in a store in which the sales floor is remote from the stockroom.

2. Description of the Related Art

One common problem that is faced by retail stores, especially those such as shoe stores, in which over 500 shoe and sneaker styles may be on display at any given time, is ensuring that all items that are on display are in the store's inventory. If displayed items are not in inventory, customer dissatisfaction and loss of sales may result. Normally, if a desired shoe style is out of inventory, the customer will either (i) return to the displays and select another style, which may itself be out of inventory, or (ii) go to a different store, each of which results in customer dissatisfaction. Accordingly, it would be desirable to have a system that, once a sales person determines from a sales computer that a selected style of shoe is out of stock, enables the customer to select from alternative styles of shoes similar to those originally selected by the customer, and to view the shoes on the sales computer, without the necessity of returning to the store display.

Various electronic catalog systems are known in the art. Such catalogs systems are shown, for example, in U.S. Pat. Nos. 5,319,542; 4,992,940; 3,757,037; 5,206,804; 5,367,627; 5,291,395; and 4,984,155. None of these systems, however, provides a method of and apparatus for enabling a store customer to view alternative styles similar to a selected style that is out of inventory so as to avid customer dissatisfaction.

In shoe and sneaker stores, when a style is selected by a customer in a particular size, the selected pair of shoes or sneakers is retrieved from a stockroom so that the customer may try the shoes on. While in some retail establishments the salespersons themselves retrieve the desired shoes from stock, in other stores an order is transmitted to a stockroom where the order is picked by a stock person and transmitted to the sales floor. The productivity of the stockroom personnel is critical in maintaining customer satisfaction in that if a customer must wait too long for the desired shoes to be retrieved, the customer may leave. Also, it is important to monitor the movement of shoes between the sales floor and the stockroom to prevent shoplifting and to monitor inventory. Accordingly, it would be desirable to have a system wherein the productivity of the salespersons and the stockroom personnel may be measured and in which the movement of items between the sales floor and stockroom is carefully monitored.

SUMMARY OF THE INVENTION

The present invention is an apparatus that displays alternative items for items that are out of stock in a store or the like. Means is provided for inputting a request for an item for viewing or purchasing the item. A computer determines from a database whether the requested item is available. If the item is unavailable, means is provided for determining alternative items for the requested item and for determining whether the alternative items are available. The available alternative items are interactively displayed for the customer.

The means for inputting a request is a computer workstation having a computer controller. The means for determining the availability of the requested item includes an inventory database, wherein the computer controller searches the inventory database to determine the availability of the item. The means for determining alternative items for the requested item includes an alternative item database wherein each item is categorized with alternative items. The computer controller searches the alternative item database to determine alternative items if the requested item is unavailable.

The means for determining the alternative items that are available includes a computer controller that determines from the inventory database the items that are available for each alternative item. The means for interactively displaying the alternative items includes mass data storage means, which stores an image of each alternative item, with the computer controller displaying each desired alternative item on the computer workstation.

A method of determining and displaying alternative items comprises the steps of:

inputting a request for an item for viewing or purchasing the item;

determining the availability of the requested item;

determining alternative items for the requested item if the requested item is unavailable;

determining alternative items for the requested item that are available; and interactively displaying such alternative items.

The step of determining the availability of the requested item includes searching an inventory database to determine the availability of the item. The step of determining alternative items for the requested item includes searching an alternative item database in which each item is categorized with alternative items. The step of interactively displaying such alternative items includes retrieving an image of each alternative item from data storage means and displaying each desired alternative item on a computer workstation.

An electronic monitoring apparatus for a store having a sales floor on which items for sale are displayed and are ordered from sales personnel, and a stock area in which stock for the items for sale is stored and from which items ordered are retrieved and transferred to the sales floor, includes:

sales computer means for entering a request for items ordered;

a database for storing the request and associated information on the item ordered for each request;

a stock area computer having a printer which prints a pick ticket having information on the item ordered, wherein the request is transmitted from the sales computer to the stock area computer; and a report generation system capable of generating a report selected from the group consisting of Items Requested, Items Delivered, Items Returned, Items Sold, Requests by SKU, Sales Person Report, Sales Person Summary Report, Time of Requests Analysis, and Time of Sales Analysis.

DETAILED DESCRIPTION OF THE INVENTION

The present invention is an apparatus for use in retail stores or the like. One typical application for the invention is in shoe or sneaker stores, in which hundreds of shoe and/or sneaker designs may be on display at any given time. While the invention will be described with respect to a retail store for shoes and/or sneakers, it will be appreciated that the invention is applicable to any appropriate retail store and to any other appropriate application, including warehouse applications.

Figure 1:
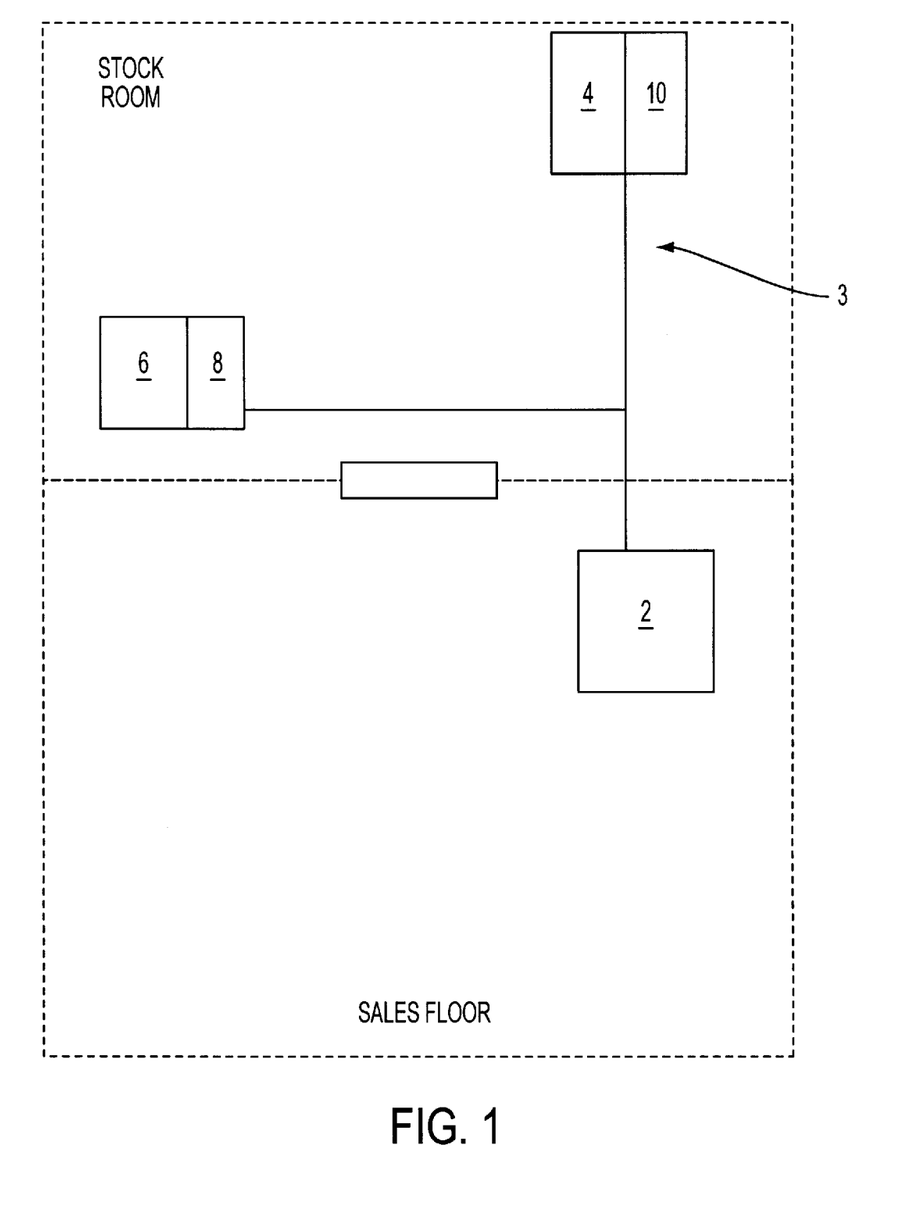
FIG. 1 is a schematic of a retail store with the Alternative Style Selection System of the present invention.

As shown in FIG. 1, located on the sales floor of the store is a sales computer 2 which is preferably an IBM$_{TM}$ compatible computer with an SVGA monitor. Sales computer 2 is preferably on a Novell$_{TM}$ or other computer network 3 running Microsoft Windows$_{TM}$ 95 and is attached via the network to an IBM PC™ compatible server computer 4 which is preferably located in an area remote from the sales floor. The server computer 4 preferably operates the MS-DOS operating system, but may operate using any other appropriate operating system. Sales floor computer 2 preferably includes a data entry device, e.g., a keyboard, track ball, mouse and/or a touch screen, and a video card that enables the display of true color, i.e., greater than 16 million colors. The aforementioned hardware configuration is not intended to limit the scope of the invention, and those skilled in the art will appreciate modifications thereof.

Operating on server computer 4 is a database that is preferably programmed in FoxPro$_{TM}$. Sales floor computer 2 communicates with the database on server computer 4 via the computer network, and operates its own database also programmed in FoxPrO$_{TM}$. While these databases will be described in detail below, the structure of the overall database is not intended to limit the scope of the invention. It is foreseen that databases having different structures could be implemented which perform the same functions as those described herein. It will be appreciated that in addition to the database fields described below, each database may contain other fields which are not part of the invention.

Figure 2:
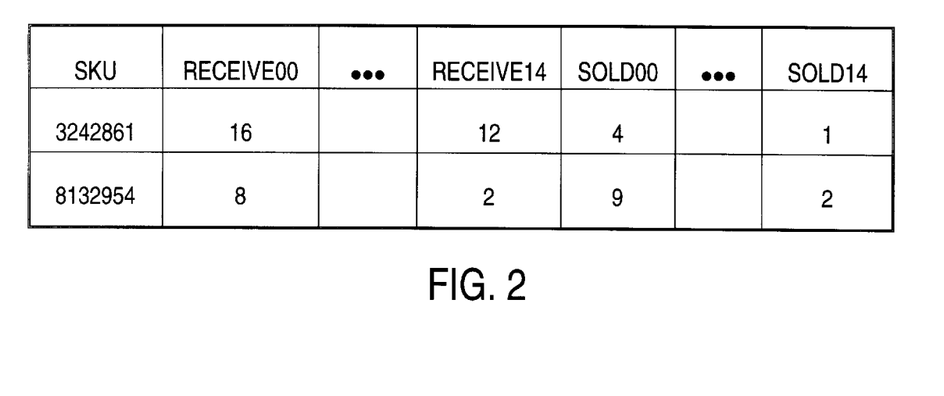
FIG. 2 is a table showing the SIZE database.

As shown in FIG. 2, the database includes a SIZE database which has the fields SKU, which is a seven-digit number that is unique to each style of item in the store, RECEIVE00 . . . RECEIVE14, and SOLD00 . . . SOLD14, wherein 00 . . . 14 represent the 15 available sizes that have been programmed into the system that are available for each SKU. Sizes 00 . . . 14 are not literal sizes but are representative of actual sizes that may be determined from a PRODUCT database and a SIZE CONVERSION database, as discussed below. If a particular item has more than 15 sizes, it will be assigned a separate SKU for the additional sizes. It is foreseen that the SIZE database could include literal sizes, if desired.

The SIZE database includes the inventory for each item in the store. The inventory for each size of each item may be determined by looking up the SKU of the item and by subtracting the number of items sold for a particular size, e.g., SOLD00, from the number of items received for that size, e.g., RECEIVE00.

Figure 3:
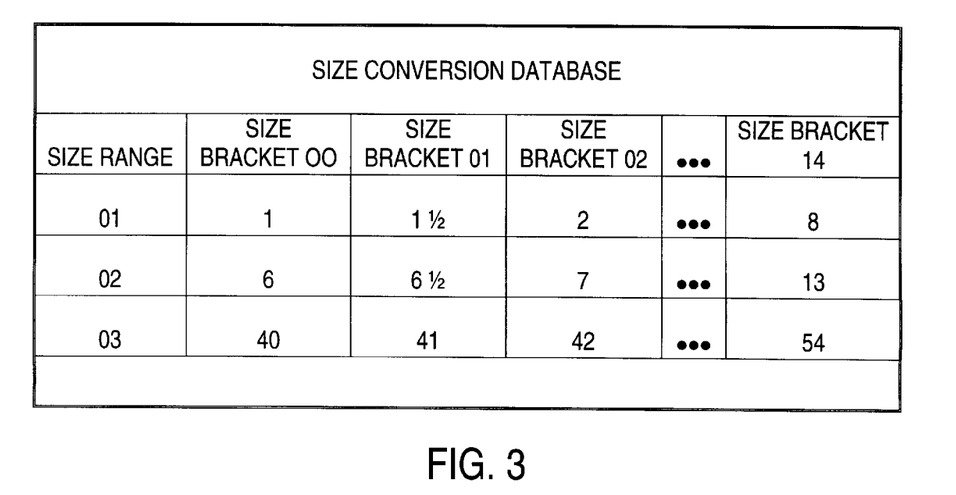
FIG. 3 is a table showing the SIZE CONVERSION database.

The PRODUCT database includes fields for SKU, SIZE RANGE, DESCRIPTION, VENDOR CODE, LOCATION and other fields that describe or are otherwise pertinent to each item in inventory. The SIZE RANGE field identifies the actual sizes to which the sizes 00 . . . 14 correspond using the SIZE CONVERSION database, as shown in FIG. 3. For example, for a particular SKU which utilizes SIZE RANGE 01, size 04 may represent an actual size 3, whereas for a sneaker using SIZE RANGE 02, size 04 may represent an actual size 9. The DESCRIPTION field contains a brief description of the item, and the VENDOR CODE field contains a vendor number for each vendor, e.g., Nike, Reebok, etc. The LOCATION field specifies the location of the item in the stockroom.

Figure 4:
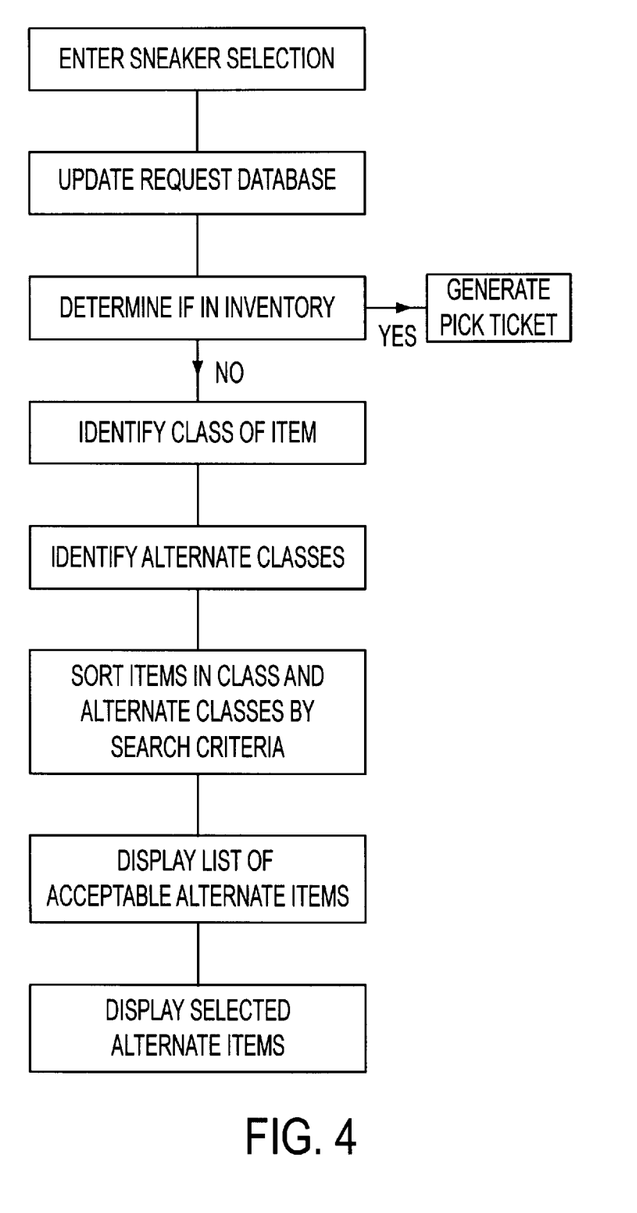
FIG. 4 is a flow diagram showing operation of the Alternative Style Selection System of the invention.

As shown in FIG. 4, in operation, once a customer has selected a sneaker style from the sneaker displays on the sales floor, the customer will show this style to the sales person, who will then determine the size of the customer's foot. The sales person reads the SKU from the selected style and enters this information into sales computer 2 along with the desired size. Sales computer 2 accesses the PRODUCT database to determine the SIZE RANGE used for that SKU, accesses the SIZE CONVERSION database to determine the size 00 . . . 14 that corresponds to the customer's actual size, and accesses the SIZE database to determine whether there is inventory in the store for the selected sneaker style in the desired size. If there is inventory of the selected style, the selected pair of sneakers is retrieved from the stockroom of the store as discussed in more detail below.

If the selected size of the selected style is out of stock, an Alternative Sneaker Selection System is activated. As previously discussed, each item in the store includes a 7-digit SKU number that identifies the item. In a preferred embodiment, the first three digits of the SKU are referred to as the "class" of the item. All items in the store are categorized into classes by the type of item.

One type of class categorization is shown in Table I.

TABLE I

| Class No. | Style |
|---|---|
| 127 | Men's running shoe |
| 128 | Women's running shoe |
| 129 | Children's running shoe |
| 140 | Men's high-top basketball shoe |
| 150 | Children's high-top basketball shoe |
| 160 | Women's walking shoe |
| 170 | Women's running shoe |
| 200 | Sandals |
| 225 | Low-top canvas sneakers |

It will be appreciated that the various classes may be further sub-categorized to any extent desirable. For example, the classes may be sub-categorized by manufacturer. Table II shows a sample of possible class definitions using such categorization.

TABLE II

| Class No. | Style |
|---|---|
| 120 | Nike men's low-top sneaker |
| 121 | Nike men's high-top sneaker |
| 122 | Nike children's low-top sneaker |
| 123 | Nike high-top children's sneaker |
| 124 | Nike women's walking shoe |
| 150 | Reebok men's low-top sneaker |
| 151 | Reebok men's high-top sneaker |
| 170 | LA Gear men's low-top sneaker |
| 171 | LA Gear men's high-top sneaker |

If desired, the classes of goods could be even further sub-categorized such as by price and product description, e.g. Nike Men's low-top white-on-white budget priced, Nike Men's low-top white-on-white moderate priced, etc.

As shown Table III, a look-up table is included on server computer 4 which groups related classes of goods, i.e., classes of goods that it is believed a consumer would consider as reasonable alternatives to the other classes in the group. For example, assuming that classes 124, 134, and 144 represent white-on-white, black-on-white, and black-on-black men's high-top basketball sneakers respectively, and class 122 represents men's white-on-white low top sneakers, the latter three classes could be grouped as alternatives to the first in the look-up table because consumers interested in white-on-white men's high-top basketball sneakers would likely be interested in black-on-white and black-on-black high-tops and white-on-white low tops as well. Assuming that class 140 represent black-on-black men's low-top sneakers, this class would also be included as an alternative to class 144, i.e., black-on-black men's high-top basketball sneakers, because consumers interested in black-on-black men's high-top basketball sneakers would likely be interested in black-on-black low-tops as well. Other classes of goods, e.g. women's walking shoes, sandals, children's high-top, children's low-top, etc., are similarly grouped.

TABLE III

| Class No. | Alternative Classes |
|---|---|
| 124 | 122, 134, 144 |
| 144 | 124, 134, 140 |

Once a size and style have been selected by the customer, and it has been determined that the selected item is not in stock, sales floor computer 2 or server computer 4 searches the lookup table of alternative classes, which is preferably a FoxPro™ database, to determine alternative styles for the customer's selection. The alternative styles that are displayed may be determined using any desired search criteria, such as the vendor. In a preferred embodiment, only items from the same vendor are displayed as alternatives.

To perform such a search for alternative items, the computer accesses the INVENTORY Database using the SKU for the selected item, and determines the VENDOR CODE for the item, which represents the name of the vendor of the item. The computer then uses the class number for the selected item and determines related classes from the look-up table. Using the INVENTORY database, the computer then searches for those items in the same class as the selected item with the same VENDOR CODE as the selected item and for those items in the alternative classes that have the same VENDOR CODE. The resultant list of items is sorted by price.

The sorted list of alternative items appears on the sales floor computer 2 with the cursor positioned nearest to the price of the selected item that was out of stock. Thus, what appears on the sales floor computer is a list of alternative styles by the same vendor sorted by price.

Stored on a mass storage device 10 on server computer 4, in JPEG format, is an image of each item for sale in the store. Mass storage device 10 may be a magnetic disk, magnetic tape, optical media, or any other appropriate storage medium. The video images may be compressed using any appropriate compression software, if desired. Using the data input device on the sales floor computer, e.g., mouse, touch screen, etc., the user may browse the alternative styles listed on the computer screen and view each style. Sales floor computer 2 accesses server computer 4 to retrieve and display an image of the selected item.

In a preferred embodiment, the server computer sorts the alternative styles so that those styles displayed are from the same manufacturer, of the same size, in the same class or related classes, and in the same price range. If desired, the system may be programmed with a preferred or alternative vendors and/or a preferred price so that alternative styles listed are not necessarily from the same manufacturer and are not necessarily in the same price range as the selected item. Also, if desired, styles from any vendor may be displayed, and these may be required to be in the same class/related class and/or in the same price range. The system may also be programmed with, or may prompt the user for, a secondary vendor to search in addition to the vendor of the style that was out of stock. It will be appreciated that various alternatives exist as to how the alternative styles are sorted and/or displayed.

Figure 5:
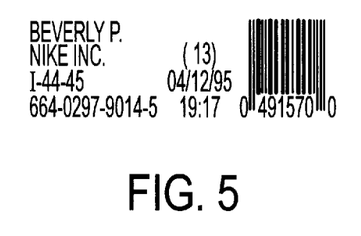
FIG. 5 is a diagram of a typical pick ticket.

As discussed above, the alternative style selection system is activated only if a selected style is out of stock. If the selected style is in stock, a REQUEST database is accessed which includes fields for REQUEST NUMBER, SKU, VENDOR CODE, SIZE REQUESTED, SALESPERSON, STATUS, DATE, REQUEST TIME, LOCATION, PRICE, TIME DELIVERED, TIME RETURNED and TIME SOLD. When an order for a particular style is entered into sales floor computer 2 by a sales person, information on the SKU, SIZE REQUESTED, and SALESPERSON are entered into the computer. Using this information, the order is assigned a REQUEST NUMBER, and the REQUEST database is updated with the information that the sales person entered and other information from the INVENTORY database for the item ordered. An order or pick ticket is printed at a stockroom computer. A typical pick ticket, as shown in FIG. 5, includes the SALESPERSON, i.e., Beverly P., the name of the vendor, i.e., Nike, Inc., which is derived from the VENDOR CODE, the LOCATION, i.e., I-44-45, the SKU, the SIZE REQUESTED, i.e., 13, the DATE, the REQUEST TIME, and the REQUEST NUMBER, i.e., 491570. This information is all stored in the REQUEST database.

A stock person takes the pick ticket and retrieves the desired item. The stockroom is equipped with a scanning computer 6, preferably an IBM PC™ compatible computer equipped with a bar code scanner 8, such as the Metrologic™ MS700 or the Symbol Technologies™ LS9100. Before delivering the ordered item to the sales floor, the stock person scans the bar code on the pick ticket, which updates the TIME DELIVERED field. If desired, each stockroom worker may be assigned an ID number or their own computer, so that the computer stores the ID of the stock worker in a database. In this manner, the duration between the REQUEST TIME and the TIME DELIVERED may be recorded and may be used to measure the productivity of the individual stock person based upon, for example, the average duration that it takes for the worker to retrieve an ordered item.

When the item is either sold or returned to the stockroom, the REQUEST NUMBER is scanned again, at which time the TIME RETURNED or TIME SOLD is recorded in the REQUEST database. If the item is sold, the SIZE and INVENTORY databases are updated to reflect the sale. The REQUEST database also includes a STATUS field which may be either 01, to indicate that an item has been requested, 02 to indicate that a pick ticket has been printed, 03 to indicate that an item has been delivered, 04 to indicate that an item has been returned, 05 to indicate that an item is out of stock, or 06 to indicate that an item has been sold. The status for each item is updated each time the status changes. For example, once a pick ticket has been generated for a requested item, its status will change from 01 to 02.

Figure 6:
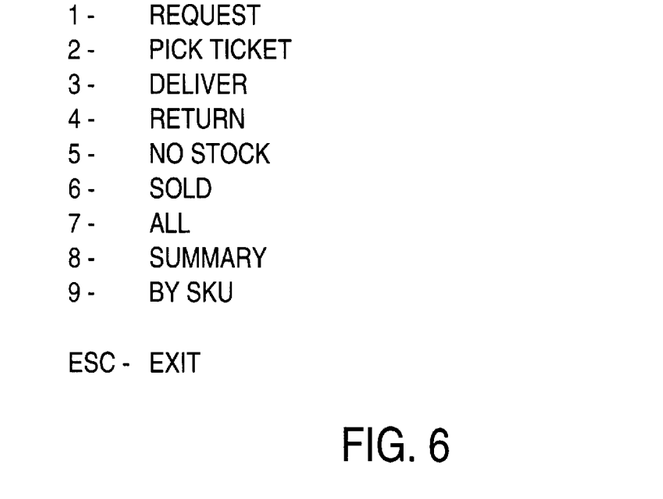
FIG. 6 is a schematic of a Request Status Report input screen.
Figure 7:
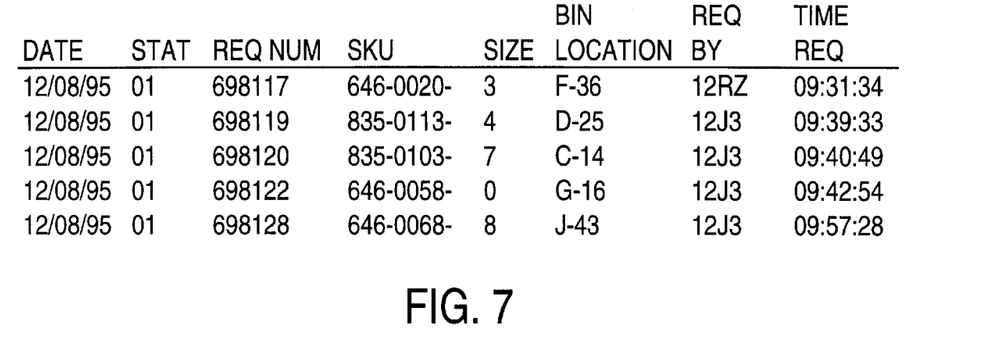
FIG. 7 is a table showing an Items Requested Report.

As shown in FIG. 6, a Request Status Report menu may be accessed by the store manager from which a number of different types of reports may be generated using the REQUEST database on the various aspects of the operation of the sales floor and stockroom. Generally speaking, each of the reports described herein may be generated for any desired period of time. FIG. 7 shows a report that may be generated showing the items that were requested during any desired time frame. As indicated above, when an item is out of stock the Alternative Style Selection System is activated. Nonetheless, when the initial request for the item out of stock is entered into the computer, this request is recorded in the REQUEST database. In this manner, customer interest in out-of-stock items may be recorded. Therefore, even though the SIZE database indicates that an item is out of inventory, the Items Requested Report (FIG. 7) will indicate customer interest in such items for cross-checking, ordering and inventory control purposes.

Figure 8:
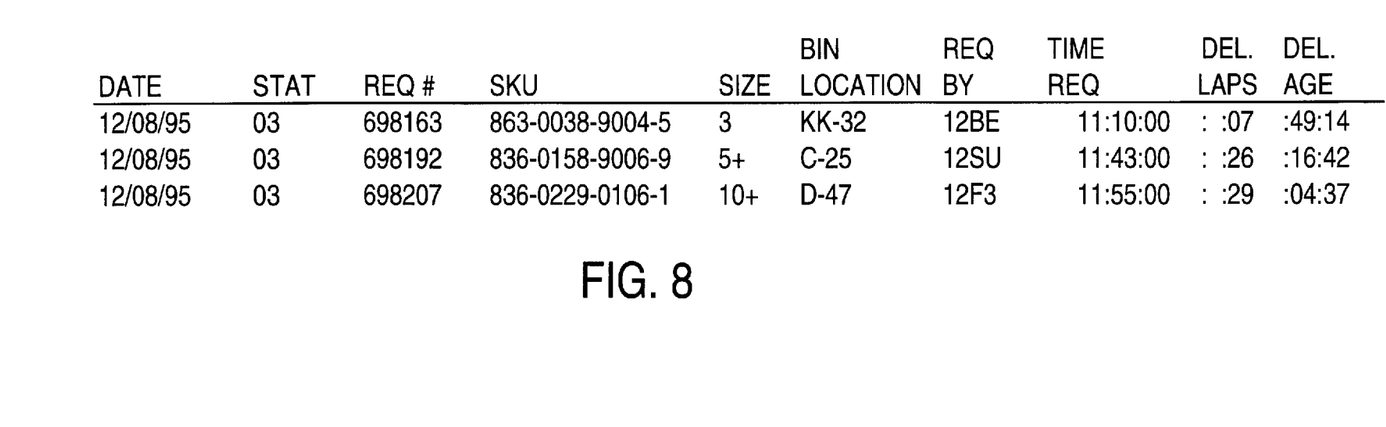
FIG. 8 is a table showing an Items Delivered Report.

FIG. 8 shows an Items Delivered Report. Normally, items that are delivered should be either returned or sold within a period of less than one hour or some other predetermined period. The Del. Age column in this table indicates the amount of time elapsed since the item was delivered. A store manager reviewing this report and seeing too large an elapsed time in the Del. Age column for a particular item would attempt to locate the item on the sales floor, since it may have been misplaced or shoplifted. The Del. Lapse column indicates the amount of time that it took the requested item to be delivered, which is useful to ensure a prompt response to customer requests.

Figure 9:
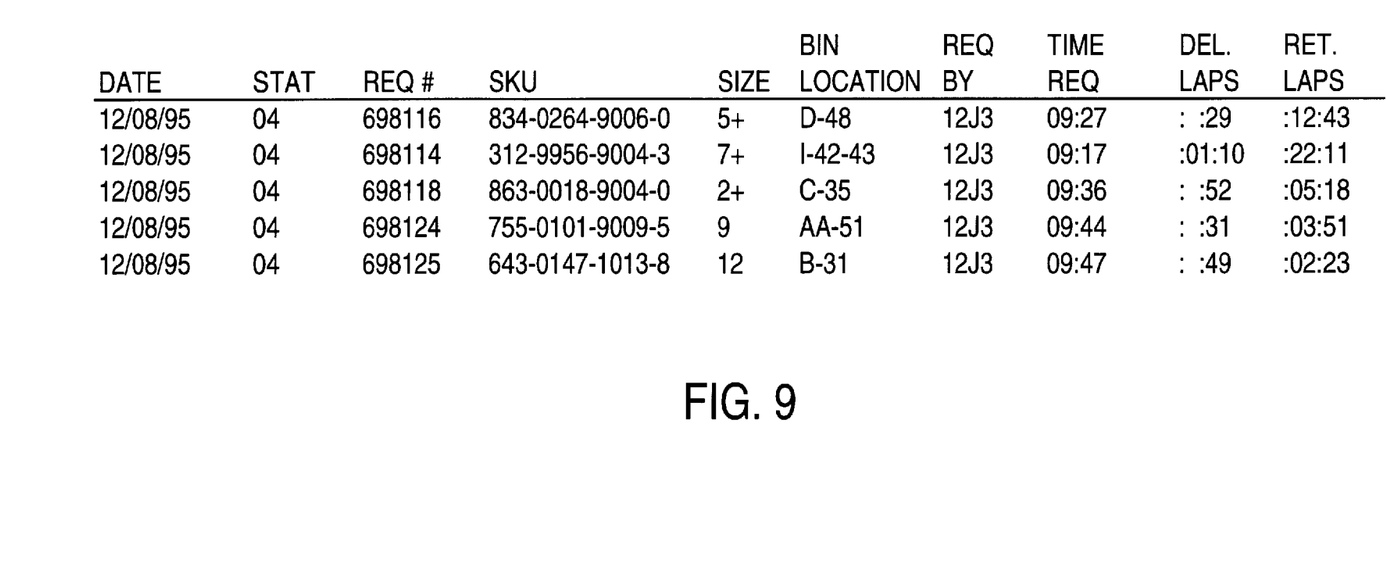
FIG. 9 is a table showing an Items Returned Report.
Figure 10:
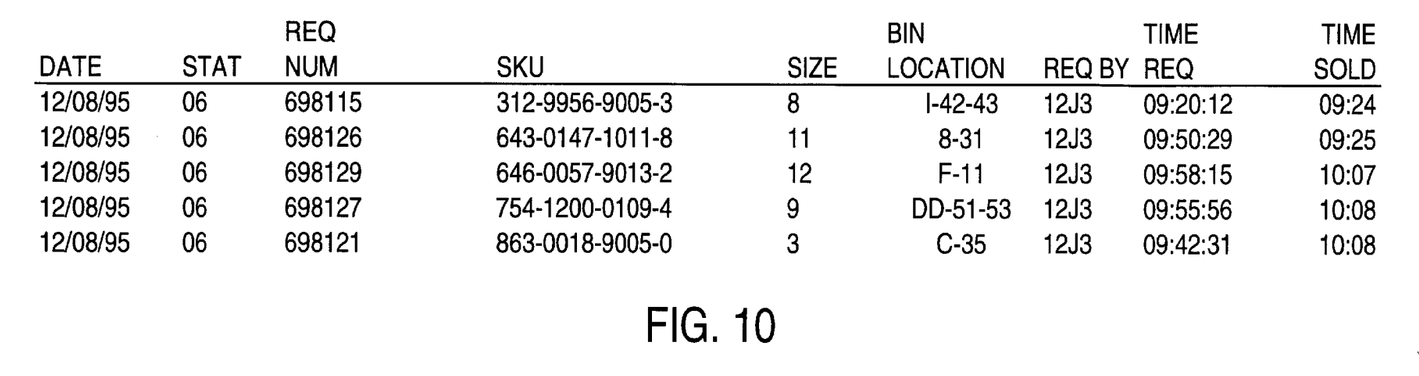
FIG. 10 is a table showing an Items Sold Report.
Figure 11:
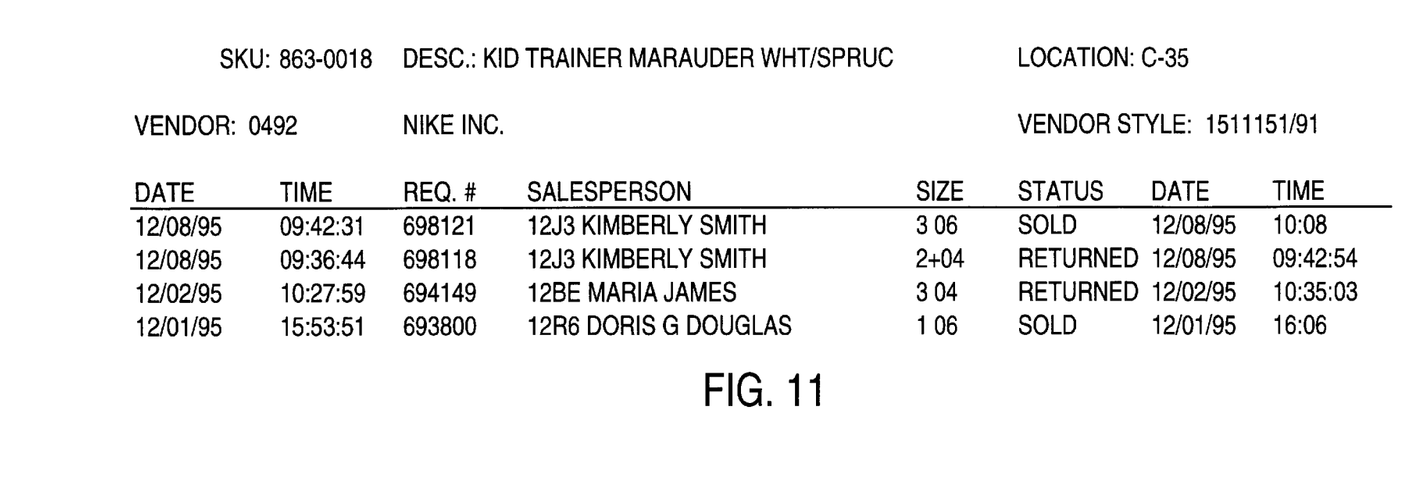
FIG. 11 is a table showing a Requests Searched by SKU Report.

FIG. 9 shows an Items Returned Report in which the Return Lapse column indicates the amount of time that the requested item was on the sales floor. FIG. 10 shows an Items Sold Report which details the items that were sold during a selected time period. If desired, the store manager may wish to gauge customer interest in particular items by reviewing the number of requests for a particular item by SKU. FIG. 11 shows a Requests List Searched by SKU Report which details the request activity for a particular SKU, and the outcome of the request, e.g., sold, returned, etc.

Figure 12:
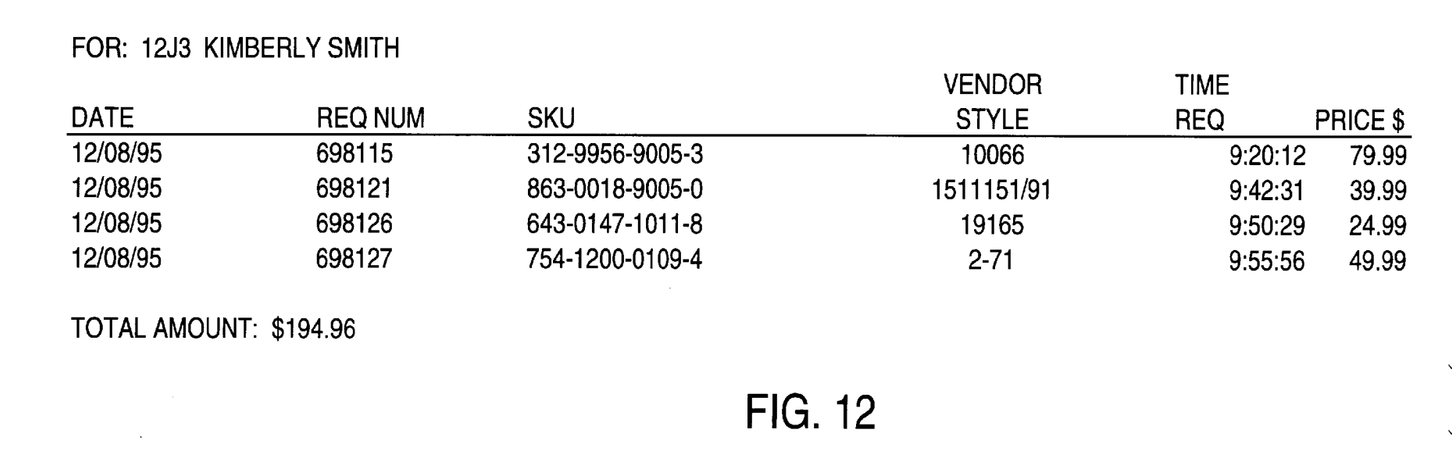
FIG. 12 is a table showing a Sales Person Report.
Figure 13:
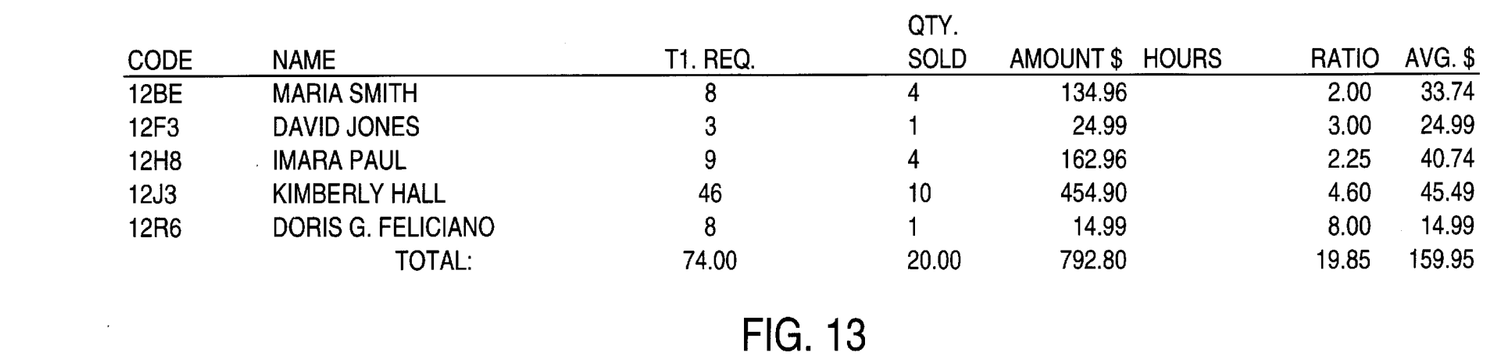
FIG. 13 is a table showing a Sales Person Summary Report.

FIGS. 12 and 13 are reports that detail the productivity of the sales force. FIG. 12 shows a Sales Person Report, which details the sales of an individual sales person for a selected period of time. FIG. 13 shows a comparison of all of the sales persons and includes, amongst others, columns for Total Items Requested (Tl. Req.), Quantity Sold (Qty. Sold), and Ratio (ratio of Sales to Requests). The Ratio field shows how effective the sales person is at converting requests to sales.

Figure 14:
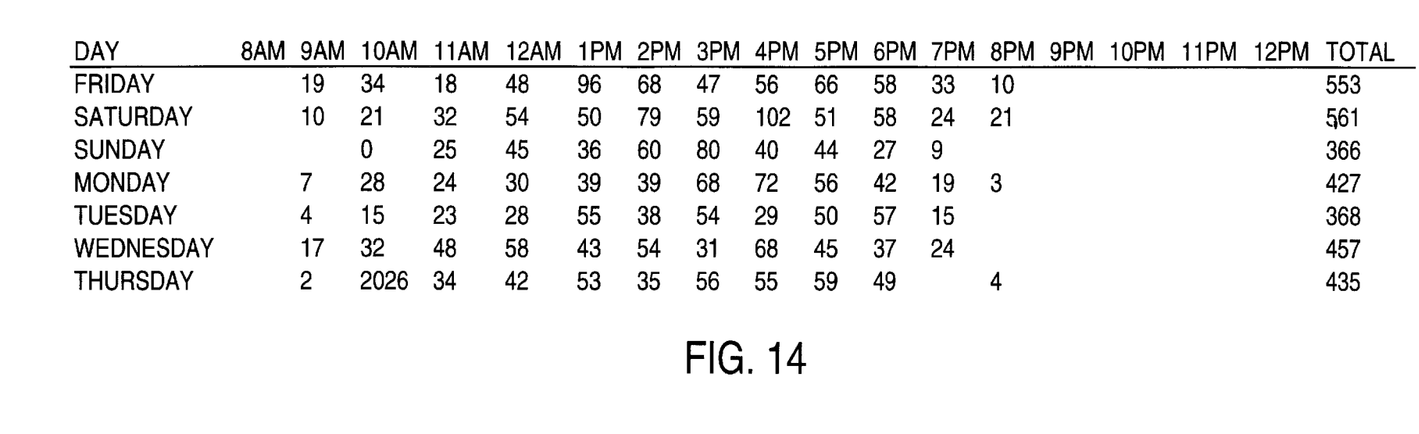
FIG. 14 is a table showing a Time of Requests Analysis Report.
Figure 15:
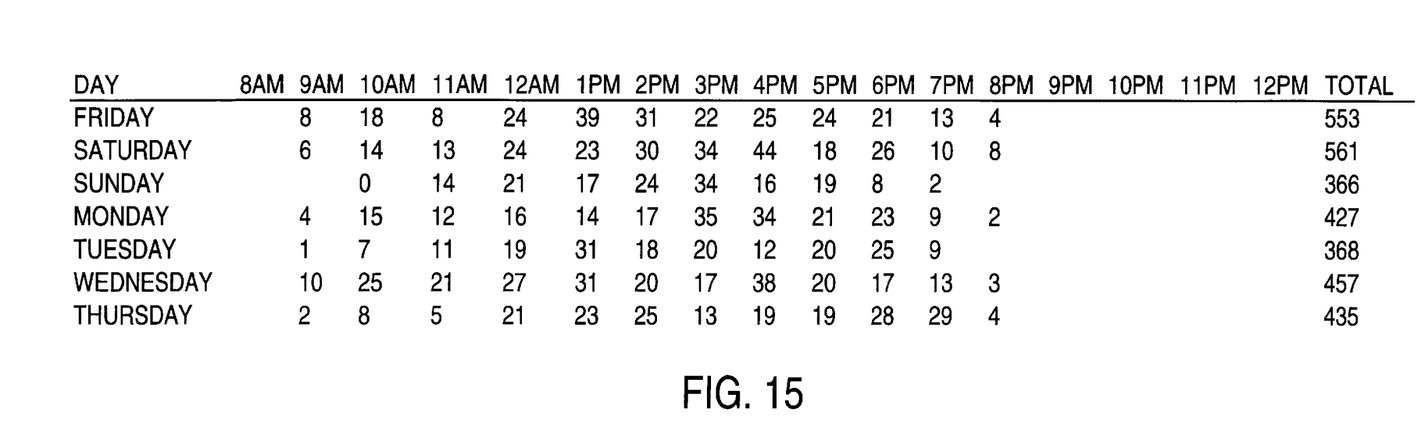
FIG. 15 is a table showing a Time of Sales Analysis Report.

FIG. 14 shows a Time of Requests Analysis Report and FIG. 15 shows a Time of Sales Analysis Report. These reports outline the number of requests and the number of sales made per hour for each day of a selected week. The content of these reports is useful for determining whether staffing is proper for each time period (e.g., the number of people working in the store should reflect the quantity of requests in each time period), and, if many requests are received in the opening or closing hours of the store, whether the store hours should be extended (or reduced if a low volume of request is received).

It will be appreciated that the particular database structure and the particular reports described herein are not intended to limit the scope of the invention since other database structures may be implemented which perform functions identical to those described herein, and different types of reports may be generated using the databases described. More generally, although the present invention has been described in detail with respect to certain embodiments and examples, variations and modifications exist which are within the scope of the present invention as defined in the following claims.

I claim:

1. An alternative item displaying apparatus which comprises:

a computer workstation for inputting a request for an item for viewing or purchasing the item;

a computerized inventory database;

a computer controller for searching the inventory database to determine the availability of the requested item;

an alternative style database wherein each item is categorized by style and each style is categorized with alternative styles, the computer controller determining the style of the requested item and searching the alternative style database to determine alternative styles for the requested item if the requested item is unavailable;

means for determining the availability of alternative items having the alternative styles from the inventory database; and means for interactively displaying such available alternative items or the availability of such alternative items.

2. The alternative style displaying apparatus according to claim 1 wherein the means for determining the alternative items that are available and for interactively displaying such alternative items comprises the computer controller determining from the inventory database the items that are available for each alternative style and interactively displaying the items of the alternative styles or the availability of the items of the alternative styles.

3. The alternative style displaying apparatus according to claim 2 wherein the means for interactively displaying the items of the alternative styles comprises data storage means comprising an image of each item of the alternative styles, the computer controller displaying each desired item of the alternative items on the computer workstation.

4. The alternative style displaying apparatus according to claim 1 wherein the means for interactively displaying such available alternative items comprises data storage means comprising an image of each alternative item, the computer controller displaying each desired alternative item on the computer workstation.

5. A method of determining and displaying alternative items comprising the steps of:

inputting a request for an item for viewing or purchasing the item;

determining from an inventory database the availability of the requested item;

providing an alternative style database wherein each item is categorized by style and each style is categorized with alternative styles:

determining the style of the requested item and searching the alternative style database to determine alternative styles for the requested item if the requested item is unavailable;

determining from the inventory database the availability of alternative items having the alternative styles; and selectively displaying or indicating the availability of such available alternative items.

6. The alternative item displaying method according to claim 5 wherein the step of interactively displaying such alternative items comprises retrieving an image of each alternative item from data storage means and displaying each desired alternative item on a computer workstation.

* * * * *